United States Patent [19]

Wulff

[11] Patent Number: 5,006,888
[45] Date of Patent: Apr. 9, 1991

[54] COPYING DEVICE FOR MODIFYING (DISTORTING) FILM PATTERNS

[76] Inventor: Michael Wulff, Grambeker Weg 162, D-2410 Mölln, Fed. Rep. of Germany

[21] Appl. No.: 444,059

[22] Filed: Nov. 30, 1989

[30] Foreign Application Priority Data

Dec. 1, 1988 [DE] Fed. Rep. of Germany ....... 3840568

[51] Int. Cl.⁵ .............................................. G03B 27/10
[52] U.S. Cl. ......................................... 355/84; 355/52
[58] Field of Search ..................................... 355/52, 84

[56] References Cited

U.S. PATENT DOCUMENTS

| | | | |
|---|---|---|---|
| 3,445,165 | 5/1969 | Dubbs | 355/84 |
| 3,560,085 | 2/1971 | Silverberg | 355/52 X |
| 4,190,347 | 2/1980 | Siegmund | 355/1 |
| 4,420,249 | 12/1983 | Trump | 355/84 |

FOREIGN PATENT DOCUMENTS

| | | |
|---|---|---|
| 0280584 | 8/1988 | European Pat. Off. . |
| 2946131 | 6/1980 | Fed. Rep. of Germany . |
| 3317057 | 2/1987 | Fed. Rep. of Germany . |
| 3516771 | 6/1987 | Fed. Rep. of Germany . |

OTHER PUBLICATIONS

Lisa-Kunststoffe-Vorabinformation nur für den internen Gebrauch (Bayer).

Primary Examiner—Richard A. Wintercorn
Attorney, Agent, or Firm—Toren, McGeady & Associates

[57] ABSTRACT

The copying device for the modification (distortion) of film patterns, which are arranged on a film to be exposed, comprises a light source 2 which is movable over the film and film pattern. A relative movement between the film pattern and the film is effected in a known manner in the axial direction of the movement of the light source in order to carry out the desired elongation or compression. Further, a slit or line diaphragm is provided, preferably in the form of a collecting lens 6, which extends transversely relative to the movement direction of the light source and is movable along with this. According to the invention, the light source 2 is substantially enclosed by a light collecting foil 3 (as is commercially available under the trademark "LISA" of the firm BAYER AG), one edge of the foil extends parallel to the line diaphragm 6 and is adjacent to it. Accordingly, a point light is radiated in spite of excitation by means of a scattered light in the edge axis. Due to the high efficiency, the collecting lens can be sharply stopped down, i.e. a very narrow light slit is usable, so that a great depth of focus is formed and a shadow-draw effect is prevented.

7 Claims, 2 Drawing Sheets

COPYING DEVICE FOR MODIFYING (DISTORTING) FILM PATTERNS

The invention is directed to a copying device according to the preamble of patent claim 1.

Such copying devices are used for the photomechanical modification of film patterns which are to be distorted, i.e. compressed or elongated, in the longitudinal direction and/or the transverse direction. For this purpose, the film pattern is arranged on the film to be exposed. The light source is moved over the film pattern and the film, wherein the relative movement is normally produced in that the film to be exposed is moved in the same axis as the light source, but the film pattern remains immobile. The type of modification depends substantially on the movement direction (elongation or compression) and on the magnitude of the movement. The quality of the modification depends to a great extent on the construction and arrangement of the light source. A point light source located at an extreme distance and a very narrow gap in the line diaphragm would be ideal in order to prevent under-radiations and changes in the line width when transferring the film pattern to the film.

In principle, two different copying devices are known. They work with a so-called "linear light source" which can involve a point light source or a scattered light source.

In a known embodiment form of a copying device, a point light source is provided in connection with a slit diaphragm, wherein the distance between point light source and diaphragm is defined by the headroom and is approximately 80 to 150 cm. The gap must be relatively wide (5 to 10 mm) in order to supply enough light energy on the film material. This results in a so-called "shadow-draw effect", i.e. changes in the line width in the movement axis. Since the light source is generally stationary, changes in the angle of incidence of the light and accordingly under-radiations occur when the slit diaphragm moves over the film. This results in blurred edges on the modified image.

Another known embodiment form comprises a scattered light source in combination with a gap or slit diaphragm and a concave mirror in a closed housing. This unit is moved in its entirety over the film pattern and the film. This embodiment form avoids an illumination of the darkroom during the exposure process, there is no dependency on the film format, and the angle of incidence of the light is always the same. However, in this embodiment form, again, there is a poor efficiency, since only a fraction of the radiated light arrives through the diaphragm in spite of the use of a mirror. In spite of the mirror, the scattered light character brings about under-radiations in the diaphragm axis and accordingly blurred edges. It is possible to use a relatively narrow gap or slit (1 to 3 mm), but a blurred image of the "light line", whose width moreover depends heavily on the thickness of the film material to be exposed, comes about nevertheless due to diffraction effects and minimal fluctuations in distance from the diaphragm to the film when moving over them.

The invention has the object of providing a copying device of the type mentioned in the beginning which ensures an extremely sharp transfer and also prevents under-radiations and is not dependent on the thickness of the pattern and film material within a wide range. At the same time, the advantages of a punctiform light source are to be provided and it is possible to work in a trouble-free manner in the darkroom.

This object is met by means of the characterizing part of claim 1.

According to the invention, a light collecting foil ("LISA foil"), which is known per se, is used. This foil is described by the owner of the trademark "LISA", the firm of BAYER AG, as follows:

"LISA plastics are colored, transparent polymers whose special optical characteristics make it possible to collect light from the surroundings, direct them to the interior of the plastic, and to radiate a large portion of the light concentrically at the edges.

This results in an edge brightness which is typical for the LISA plastics. The optical properties of the LISA plastics rely on natural physical laws. They are the result of the cooperation of fluorescent dyes, high purity with transparent, optically pure polymers, and the geometric structure of the plastics parts.

There are dyes which absorb a part of the (white) light and convert it into invisible heat energy. Other dyes convert the received light energy into visible light (definition of fluorescence)." These LISA plastic foils collect light on the large upper and lower sides thereof and yield it through the edges thereof.

The invention makes use of such a known LISA foil in order to collect the light from the linear light source, which is preferably a scattered light source, (for this purpose it encloses the latter substantially like a screen) and guide it to the diaphragm. The corresponding edge which emits the light is arranged so as to be parallel and adjacent to the line diaphragm in order to ensure a transmission of the light emerging from this edge through the line diaphragm to the film to be exposed which is as free of losses as possible.

In an advantageous manner, the line diaphragm is a rod-shaped collecting lens which takes over the function of the bundling or focusing slit or gap. But it is also possible to use a conventional slit diaphragm.

If a collecting lens is used, this can be done in an advantageous manner as defined in claims 3 and 4.

According to the invention, a very narrow image can be projected (0.1 to 0.3 mm) so that the so-called "shadow-draw effect" is prevented. The light radiated by the light collecting foil has a point light character, so that there are also no under-radiations with proper film contact. So-called screen patterns can be readily processed. at least up to a 60-type or 150-line screen.

The angle of incidence of the light is independent from the film format. It is also substantial that the efficiency is much better than in known copying devices with a scattered light surface, specifically, approximately by a factor of 10. Finally, the thickness of the film is not critical.

The invention is explained in more detail in the following with reference to the drawing with the aid of an embodiment example.

Figure 1:
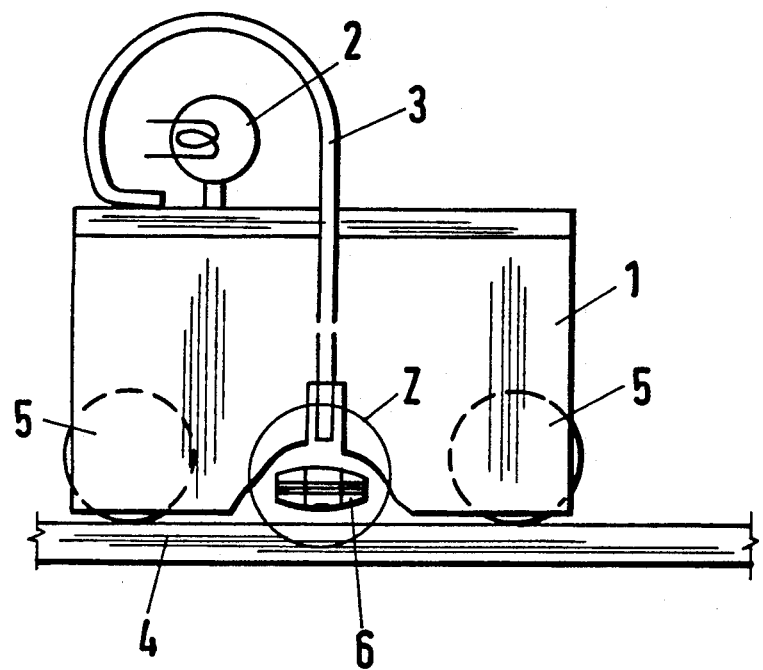
FIG. 1 shows a side view of an embodiment form of a copying device according to the invention.
Figure 2:
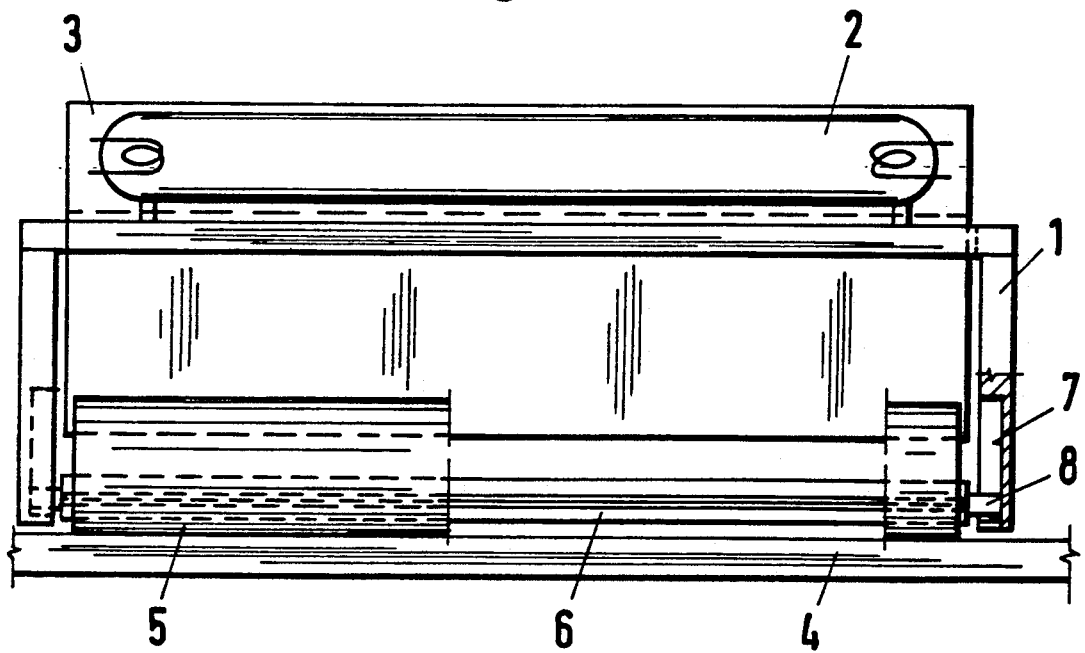
FIG. 2 shows a view of the view according to FIG. 1 rotated by 90°, in the direction of the movement axis.

The copying device is shown schematically in the drawing with its substantial structural component parts. It comprises a housing 1 on which the linear light source is arranged in the form of a scattered light source, in this instance a cold-light neon tube 2. The cold-light neon tube 2 is enclosed in a screen-like manner by the light collecting foil 3, wherein the light collecting foil extends into the housing 1. One lower edge of the light collecting foil 3, which lies in the housing 1, is at a distance from a stationary table 4 forming the film plane. This edge, which is the light-radiating edge essential for the exposure, extends parallel to the film plane. The line diaphragm, which is formed by means of a rod-shaped collecting lens 6 in this embodiment form, is arranged between the film plane and this edge. The collecting lens extends in the longitudinal direction parallel to the light-radiating edge of the light collecting foil 3. In FIG. 2, the collecting lens 6 can be seen in the longitudinal direction and, in FIG. 1, practically in cross section.

Two contact pressure rollers 5 which can roll on the film pattern 11 are supported in the housing.

Figure 3:
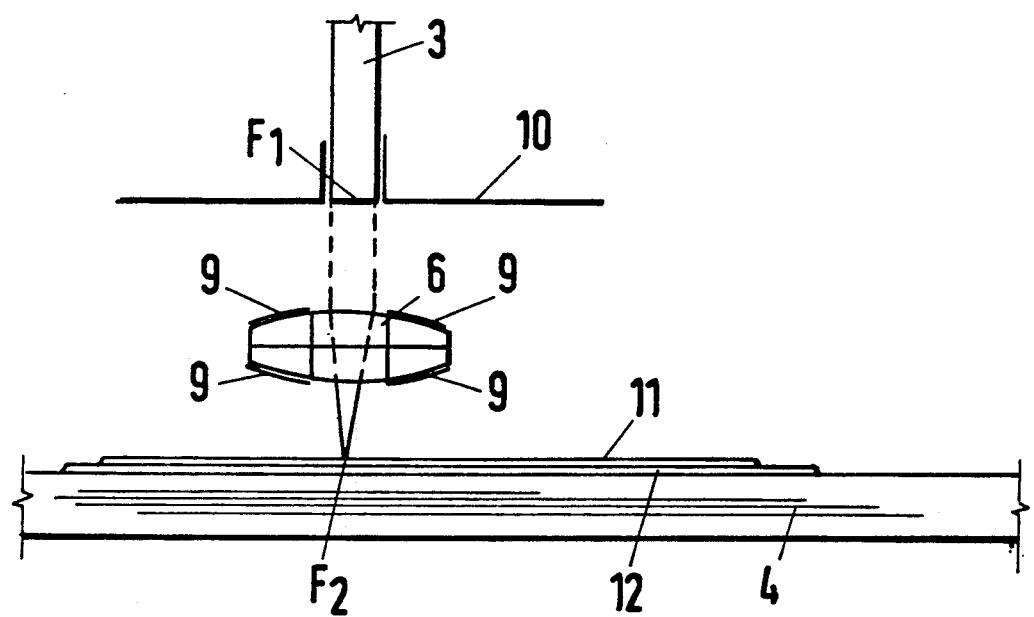
FIG. 3 shows the detail Z of FIG. 1 in enlarged scale.

In FIG. 3 it can be seen that the film 12 to be exposed and the film pattern 11 are arranged on the table forming the film plane. It cannot be seen from the drawing how the relative movement between the film pattern and the film is carried out. This movement can be carried out in a wide variety of ways. It is effected from the left to the right, or from the right to the left, with respect to the views in FIGS. 1 and 3. With respect to the view in FIG. 2, this movement is effected vertically relative to the drawing plane.

The two focal points of the collecting lens 6 are designated by $F_1$ and $F_2$. In the shown embodiment form, the light-radiating edge of the light collecting foil 3 lies in the focal point $F_1$ and the film 12 to be exposed lies in the focal point $F_2$. Because of the high efficiency, the collecting lens 6 can be darkened as is indicated at 9. Accordingly, there is a great depth of focus. An additional covering in the housing 1 is designated by 10.

When a film 12 is exposed through a film pattern 11 and a desired modification is to be carried out, the two movements are carried out in one axial direction. One movement is the relative movement between the film 12 and the film pattern 11 which determines the extent of the modification. The other movement in the same axial direction is the movement of the housing 1 with the light source 2 of the light collecting foil 3, the collecting lens 4 and the contact pressure rollers 5 which roll on the film pattern.

It can be seen in addition in FIG. 2 that the collecting lens 6 is supported in the housing 1 by means of a guide 7, 8 so as to be vertically adjustable. The distance from the film and from the light-radiating edge of the light collecting foil can be set and adjusted.

I claim:

1. Device for the modification (distortion) of film patterns which are arranged on a film to be exposed, are moved relative to the latter corresponding to a desired elongation or compression, and are exposed by means of a light source which is moved over the film pattern and the film in the axial direction determined by the relative movement between the film pattern and the film, wherein a line diaphragm is provided between the film pattern and the film on the one hand and the light source on the other hand, which line diaphragm can be moved along with the latter, characterized in that the light source (2) is substantially enclosed in a screen-like manner by a light collecting foil (3), and one edge of the foil extends parallel to the line diaphragm (6) and is adjacent to it.

2. Copying device according to claim 1, the line diaphragm is formed by a rod-shaped collecting lens (6), the film (12) to be exposed lying in a focal point ($F_2$) of the collecting lens (6).

3. Copying device according to claim 2, wherein a light-radiating foil edge of the light collecting foil (3) lies parallel to the line diaphragm and lies in the other focal point ($F_1$) of the collecting lens (6).

4. Copying device according to claim 2 or 3, wherein the collecting lens is darkened at its side.

5. Copying device according to claim 1, wherein the line diaphragm is formed by a gap diaphragm.

6. Copying device according to claim 1, wherein the light source is a scattered light source (2).

7. A copying device according to claim 6, wherein the scattered light source is a cold-light neon tube.

* * * * *